US012591494B2

(12) United States Patent
Cheng

(10) Patent No.: US 12,591,494 B2
(45) Date of Patent: Mar. 31, 2026

(54) FAULTY LINK SWITCHING METHOD AND SYSTEM, AND RELATED DEVICE

(71) Applicant: Huawei Technologies Co., Ltd., Shenzhen (CN)

(72) Inventor: Jike Cheng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 18/181,158

(22) Filed: Mar. 9, 2023

(65) Prior Publication Data

US 2023/0205654 A1     Jun. 29, 2023

Related U.S. Application Data

(63) Continuation of application No. PCT/CN2021/117211, filed on Sep. 8, 2021.

(30) Foreign Application Priority Data

Sep. 10, 2020    (CN) .......................... 202010947350.4

(51) Int. Cl.
| | |
|---|---|
| *G06F 11/00* | (2006.01) |
| *G06F 11/07* | (2006.01) |
| *G06F 11/20* | (2006.01) |

(52) U.S. Cl.
CPC ...... *G06F 11/2089* (2013.01); *G06F 11/0727* (2013.01); *G06F 11/2007* (2013.01)

(58) Field of Classification Search
None
See application file for complete search history.

(56) References Cited

U.S. PATENT DOCUMENTS

| | | | | |
|---|---|---|---|---|
| 7,668,981 | B1 * | 2/2010 | Nagineni ................ | H04L 43/16 |
| | | | | 710/36 |
| 8,954,808 | B1 * | 2/2015 | McLean .............. | G06F 11/2005 |
| | | | | 714/48 |
| 2003/0212785 | A1 * | 11/2003 | Jibbe ....................... | H04L 43/00 |
| | | | | 709/224 |
| 2004/0078632 | A1 * | 4/2004 | Infante .................. | G06F 3/0613 |
| | | | | 714/4.2 |
| 2007/0297338 | A1 * | 12/2007 | Mou ................... | H04L 67/1097 |
| | | | | 370/242 |
| 2008/0253295 | A1 | 10/2008 | Yumoto et al. | |
| 2020/0379857 | A1 * | 12/2020 | Shah ................... | G06F 11/0757 |

FOREIGN PATENT DOCUMENTS

CN            105760261 A        7/2016

OTHER PUBLICATIONS

Google Scholar/Patents search—text refined (Year: 2024).*
Google Scholar/Patents search—text refined (Year: 2025).*

* cited by examiner

*Primary Examiner* — Christopher S McCarthy
(74) *Attorney, Agent, or Firm* — Slater Matsil, LLP

(57) ABSTRACT

In an embodiment a switching system includes a host, a storage device and at least two links existing between the host and the storage device, wherein the storage device is configured to monitor the at least two links and to send faulty link information to the host when detecting a link fault, and wherein the host is configured to receive the faulty link information sent by the storage device and to switch, based on the faulty link information, a service on a faulty link corresponding to the faulty link information to a normal link in the at least two links.

19 Claims, 5 Drawing Sheets

500

600

700

710

730

Processor

740

720

Memory

Application

Data

Communication
interface

FAULTY LINK SWITCHING METHOD AND SYSTEM, AND RELATED DEVICE

CROSS-REFERENCE TO RELATED APPLICATIONS

This application is a continuation of International Application No. PCT/CN2021/117211, filed on Sep. 8, 2021, which claims priority to Chinese Patent Application No. 202010947350.4, filed on Sep. 10, 2020. The disclosures of the aforementioned applications are hereby incorporated by reference in their entireties.

TECHNICAL FIELD

The present invention relates to the field of storage technologies, and in particular, to a faulty link switching method and system, and a related device.

BACKGROUND

A small computer system interface (SCSI) protocol and a non-volatile memory express over fabrics (NVMe-oF) are commonly used network storage transmission standard protocols. In SCSI and NVMe-oF networking scenarios, a fiber channel (FC) switch is used to connect a storage device to a server host, to establish a storage area network (SAN) dedicated for data storage. In the SAN, a plurality of links exist between the host and the storage device, and the host delivers services by using the plurality of links in the SAN. If a link is faulty in a process in which the host delivers a service, the service needs to be switched from the faulty link to a normal link for delivery. A time required for switching the service from the faulty link to the normal link is referred to as a service switching time. In a storage system, the service switching time is an important parameter for measuring overall reliability of the system. Generally, a shorter service switching time indicates higher reliability of the system. In a service switching process, a time for an HBA driver to sense link disconnection greatly affects the service switching time.

Currently, the time for the host bus adapter (HBA) driver to sense link disconnection is manually configured. If the HBA driver does not receive, within the configured time, feedback information indicating that I/O execution is completed, the HBA determines that the link is faulty, and sends error code to multipathing software of the host, so that the multipathing software performs service switching. To shorten the service switching time, the time for the driver to sense link disconnection may be set to a relatively small value. However, if the time is set to an excessively small value, intermittent disconnection may be misjudged as a link fault.

SUMMARY

Embodiments of the present invention disclose a faulty link switching method and system, and a related device, so as to quickly sense a faulty link and complete link switching, shorten a service switching time, and improve system reliability.

According to a first aspect, this application provides a faulty link switching system. The system includes a host and a storage device, and at least two links exist between the host and the storage device. The storage device is configured to: monitor the at least two links, and send faulty link information to the host when detecting a link fault. The host is configured to: receive the faulty link information sent by the storage device, and switch, based on the faulty link information, a service on a faulty link corresponding to the faulty link information to a normal link in the at least two links.

In the solution provided in this application, the storage device monitors the link and sends the faulty link information to the host, so that the host can quickly sense the faulty link and complete link switching based on the faulty link information, so as to shorten a service switching time and improve system reliability.

With reference to the first aspect, in a possible implementation of the first aspect, the host is further configured to send a query request for querying the faulty link information to the storage device; and the storage device is further configured to: add the faulty link information to feedback information of the query request, and send the feedback information to the host.

In the solution provided in this application, the host sends the query request, so that the storage device can add the detected faulty link information to the feedback information of the query request and return the feedback information to the host. In this way, the host can be prevented from actively sensing the faulty link, and a time for the host to sense the faulty link can be effectively shortened.

With reference to the first aspect, in a possible implementation of the first aspect, the host is further configured to disconnect the faulty link based on the faulty link information.

In the solution provided in this application, after receiving the faulty link information returned by the storage device, the host actively disconnects the faulty link. In this way, a service switching time is effectively shortened. Optionally, after receiving the faulty link information, the host may determine a link identifier that matches the faulty link information, and then delete the link identifier to disconnect the faulty link; or the host marks a state of the faulty link as an unavailable state to disconnect the faulty link.

With reference to the first aspect, in a possible implementation of the first aspect, when switching, based on the faulty link information, the service on the faulty link corresponding to the faulty link information to the normal link in the at least two links, the host is specifically configured to: send, by a host bus adapter HBA card driver of the host, error code to multipathing software of the host, and switch, by the multipathing software of the host, the service on the faulty link to the normal link.

In the solution provided in this application, after the host disconnects the faulty link, the HBA card driver is triggered to send the error code to the multipathing software of the host, s that the multipathing software completes service switching based on the error code. In this way, a time for an HBA card to sense the faulty link can be effectively shortened, and system reliability can be improved.

With reference to the first aspect, in a possible implementation of the first aspect, the host sends, to the storage device based on a preset period, the query request for querying the faulty link information; or the host continuously and serially sends the query request for querying the faulty link information to the storage device.

In the solution provided in this application, the host may flexibly deliver the query request to the storage device, so that the storage device can return the faulty link information in time based on the query request.

With reference to the first aspect, in a possible implementation of the first aspect, the faulty link information is unique identification information of the faulty link, the unique identification information of the faulty link includes world wide names WWNs or Internet Protocol IP addresses of an
initiator and a target, the initiator is a port of the faulty link
on the host, and the target is a port of the faulty link on the
storage device.

With reference to the first aspect, in a possible implemen-
tation of the first aspect, the storage device is further
configured to send the faulty link information to the host by
using the normal link in the at least two links.

In the solution provided in this application, after adding
the faulty link information to the feedback information of
the query request, the storage device sends the feedback
information to the host by using the normal link in the at
least two links. This can ensure that the host can correctly
receive the faulty link information and complete link switch-
ing, and the normal link may be a link by using which the
host can normally deliver a service.

According to a second aspect, this application provides a
faulty link switching method, including: A host receives
faulty link information sent by a storage device, where at
least two links exist between the host and the storage device;
and the host switches, based on the faulty link information,
a service on a faulty link corresponding to the faulty link
information to a normal link in the at least two links.

In the solution provided in this application, the host
switches the service on the faulty link to the normal link by
receiving the faulty link information sent by the storage
device. This can shorten a time for the host to sense the
faulty link, to further shorten a service switching time, and
improve system reliability.

With reference to the second aspect, in a possible imple-
mentation of the second aspect, the host sends a query
request for querying the faulty link information to the
storage device; and the host receives feedback information
that is of the query request and that is sent by the storage
device, where the feedback information carries the faulty
link information.

With reference to the second aspect, in a possible imple-
mentation of the second aspect, the host disconnects the
faulty link based on the faulty link information.

With reference to the second aspect, in a possible imple-
mentation of the second aspect, an HBA card driver of the
host sends error code to multipathing software of the host,
and the multipathing software of the host switches the
service on the faulty link to the normal link.

With reference to the second aspect, in a possible imple-
mentation of the second aspect, the host sends, to the storage
device based on a preset period, the query request for
querying the faulty link information; or the host continu-
ously and serially sends the query request for querying the
faulty link information to the storage device.

With reference to the second aspect, in a possible imple-
mentation of the second aspect, the faulty link information
is unique identification information of the faulty link, the
unique identification information of the faulty link includes
world wide names WWNs or Internet Protocol IP addresses
of an initiator and a target, the initiator is a port of the faulty
link on the host, and the target is a port of the faulty link on
the storage device.

According to a third aspect, this application provides a
faulty link switching method, including: A storage device
monitors a link for interacting with a host, where at least two
links exist between the storage device and the host; the
storage device sends faulty link information to the host when
detecting a link fault, so that the host switches a service on
a faulty link to a normal link in the at least two links based on the faulty link information; and the storage device
receives a service delivered by the host by using the normal
link.

With reference to the third aspect, in a possible imple-
mentation of the third aspect, the storage device receives a
query request that is sent by the host and that is used to query
the faulty link information; and adds the faulty link infor-
mation to feedback information of the query request, and
sends the feedback information to the host.

With reference to the third aspect, in a possible imple-
mentation of the third aspect, the storage device sends the
faulty link information to the host by using the normal link
in the at least two links.

With reference to the third aspect, in a possible imple-
mentation of the third aspect, the storage device receives the
query request that is sent by the host based on a preset period
and that is used to query the faulty link information; or the
storage device receives the query request that is sent by the
host serially and that is used to query the faulty link
information.

With reference to the third aspect, in a possible imple-
mentation of the third aspect, the faulty link information is
unique identification information of the faulty link, the
unique identification information of the faulty link includes
world wide names WWNs or Internet Protocol IP addresses
of an initiator and a target, the initiator is a port of the faulty
link on the host, and the target is a port of the faulty link on
the storage device.

According to a fourth aspect, this application provides a
network device, including: a receiving unit, configured to
receive faulty link information sent by a storage device,
where at least two links exist between the network device
and the storage device; and a processing unit, configured to
switch, based on the faulty link information, a service on a
faulty link corresponding to the faulty link information to a
normal link in the at least two links.

With reference to the fourth aspect, in a possible imple-
mentation of the fourth aspect, the network device further
includes a sending unit. The sending unit is configured to
send a query request for querying the faulty link information
to the storage device. The receiving unit is specifically
configured to receive feedback information that is of the
query request and that is sent by the storage device, where
the feedback information carries the faulty link information.

With reference to the fourth aspect, in a possible imple-
mentation of the fourth aspect, the processing unit is further
configured to disconnect the faulty link based on the faulty
link information.

With reference to the fourth aspect, in a possible imple-
mentation of the fourth aspect, the processing unit is spe-
cifically configured to: send error code to multipathing
software, and switch, by the multipathing software, the
service on the faulty link to the normal link.

According to a fifth aspect, this application provides a
storage device, including: a monitoring unit, configured to
monitor a link for interacting with a host, where at least two
links exist between the storage device and the host; a
sending unit, configured to send faulty link information to
the host when the monitoring unit detects a link fault, so that
the host switches a service on a faulty link to a normal link
in the at least two links based on the faulty link information;
and a receiving unit, configured to receive a service deliv-
ered by the host by using the normal link.

With reference to the fifth aspect, in a possible imple-
mentation of the fifth aspect, the receiving unit is further
configured to receive a query request that is sent by the host
and that is used to query the faulty link information; and the sending unit is further configured to: add the faulty link information to feedback information of the query request, and send the feedback information to the host.

With reference to the fifth aspect, in a possible implementation of the fifth aspect, the sending unit is specifically configured to send the faulty link information to the host by using the normal link in the at least two links.

According to a sixth aspect, this application provides a computing device. The computing device includes a processor and a memory. The processor and the memory are connected by using an internal bus. The memory stores instructions, and the processor invokes the instructions in the memory to perform the faulty link switching method provided in the second aspect in combination with any implementation in the second aspect.

According to a seventh aspect, this application provides a computing device. The computing device includes a processor and a memory. The processor and the memory are connected by using an internal bus. The memory stores instructions, and the processor invokes the instructions in the memory to perform the faulty link switching method provided in the third aspect in combination with any implementation in the third aspect.

According to an eighth aspect, this application provides a computer storage medium. The computer storage medium stores a computer program. When the computer program is executed by a processor, a procedure of the faulty link switching method provided in the second aspect in combination with any implementation of the second aspect can be implemented.

According to a ninth aspect, this application provides a computer storage medium. The computer storage medium stores a computer program. When the computer program is executed by a processor, a procedure of the faulty link switching method provided in the third aspect in combination with any implementation of the third aspect can be implemented.

According to a tenth aspect, this application provides a computer program product. The computer program includes instructions. When the computer program is executed by a computer, the computer is enabled to perform a procedure of the faulty link switching method provided in the second aspect in combination with any implementation of the second aspect.

According to an eleventh aspect, this application provides a computer program product. The computer program includes instructions. When the computer program is executed by a computer, the computer is enabled to perform a procedure of the faulty link switching method provided in the third aspect in combination with any implementation of the third aspect.

BRIEF DESCRIPTION OF THE DRAWINGS

To describe the technical solutions in embodiments of the present invention more clearly, the following briefly describes the accompanying drawings required for describing the embodiments. It is clear that the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
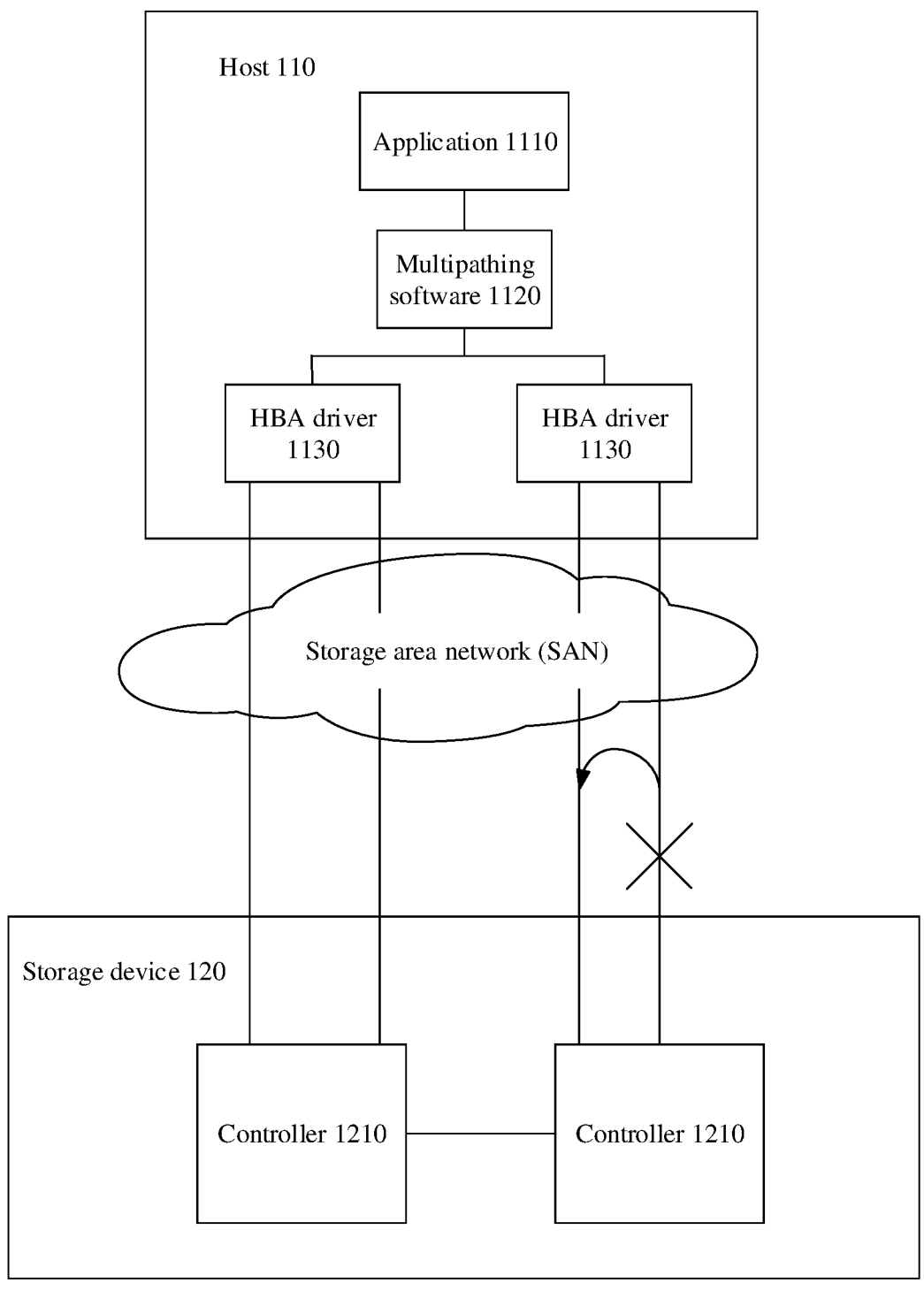
FIG. 1 is a schematic diagram of a link switching scenario according to an embodiment of this application.

The following clearly and describes technical solutions in embodiments of this application with reference to accompanying drawings. It is clear that the described embodiments are merely some rather than all embodiments of this application.

Some terms and related technologies in this application are first described with reference to the accompanying drawings, to facilitate understanding by a person skilled in the art.

Various services and applications (for example, a multipath management service and a link sensing service) may be deployed in a host, and may be specifically deployed in a physical machine, a virtual machine, a container, and the like, and are used to deliver a service to a storage device. For example, the host is an application server or a distributed file system server.

The storage device may also be referred to as a storage array, and may specifically include a device that can store data in a form of external centralized storage, distributed storage, or the like, and is configured to receive the service delivered by the host. The storage device is, for example, a storage server or a distributed database server.

A link is a communication channel between the host and the storage device, and is used for information exchange between the host and the storage device. Generally, a plurality of links exist between the host and the storage device, and the host may select any one of the plurality of links to deliver a service.

A small computer system interface (SCSI) protocol mainly transfers a command, a status, and block data between the host and the storage device. An input/output (I/O) operation performed by an operating system on an external device (for example, a magnetic disk, a magnetic tape, or an optical storage) may be implemented by using the SCSI protocol. Generally, the SCSI protocol is embedded in an onboard logic of a device driver or a host adapter.

A non-volatile memory express over fabrics (NVMe-oF) is used to support network storage of a data center, and implement extension of the NVMe standard on a high-speed serial computer expansion bus standard (PCIe) bus. The NVMe-oF uses a message-based model to send a request and a response between the host and the storage device by using a network, replacing the PCIe to extend a communication distance between an NVMe host and an NVMe storage subsystem.

A storage area network (SAN) uses an FC technology. The storage device and the server host are connected by using an FC switch. The storage area network is a dedicated network that is established for storage and that is independent of a transmission control protocol/internet protocol (TCP/IP) network. The SAN provides a method for connecting to an existing local area network (LAN) and supports the SCSI protocol and the IP protocol by using a same physical channel.

A host bus adapter (HBA) is a card that can be inserted into a computer or a mainframe, and is an indispensable device for connecting the host to an FC network. The HBA connects the host to the storage device or a storage device network by using a fiber channel or an SCSI, and provides I/O processing and a physical connection between the host and the storage device.

Currently, in a process in which the host delivers a service to the storage device, when a link is faulty, a host side (for example, the HBA card) senses the fault. After sensing that the link is disconnected, the host side switches the current faulty link, and selects another normal link to deliver the service. The normal link may be specifically a link by using which the host can normally deliver the service to the storage device. FIG. 1 is a schematic diagram of a link switching scenario. An application 1110, multipathing software 1120, and an HBA driver 1130 are deployed in a host 110. The application 1110 generates a service that needs to be delivered, and delivers the service to a storage device 120 by using the HBA driver 1130. The host 110 and the storage device 120 are connected by using a SAN. A plurality of links exist in the SAN. A controller 1210 is deployed in the storage device 120. The controller 1210 is configured to receive and process the service delivered by the host 110. When a link that is delivering a service is faulty or the controller 1210 is faulty, after a period of time, the HBA driver 1130 senses that the link is already disconnected. For example, the HBA driver may sense the link fault by using a timeout mechanism. When the HBA driver does not receive, within a preset time, a feedback that I/O execution is completed, the HBA driver may determine that the link is already disconnected and cannot continue to use the link to deliver the service. The HBA driver 1130 returns error code (for example, linkdown) to the multipathing software 1120. After receiving the error code returned by the HBA driver 1130, the multipathing software 1120 parses the error code, to determine that the current link is already disconnected and cannot be used, and then selects another link to deliver the service again. If the service is successfully delivered to the storage device 120, the multipathing software 1120 may determine that the reselected link is a normal link, and then notify the application 1110 that the reselected link can be used to deliver the service. It can be learned that, when a link is faulty, link switching needs to be performed to complete service switching. A time that needs to be consumed in an entire process is a time for the HBA driver 1130 to sense link disconnection, a time for the HBA driver 1130 to process the returned error code, a time for the multipathing software 1120 to perform switching processing, and a time for the multipathing software 1120 to determine the reselected link as the normal link. Both the time for the multipathing software 1120 to perform switching processing and the time for the multipathing software 1120 to determine the reselected link as the normal link are relatively short, usually several milliseconds. Therefore, a main time consumed in the entire switching process is the time for the HBA driver 1130 to sense link disconnection and the time for the HBA driver 1130 to process the returned error code. To quickly complete link switching and shorten the service switching time, the time for the HBA driver to sense link disconnection is usually manually configured. For example, in an FC networking scenario in which an FC (Qlogic) HBA is used in a Linux file system, the dev_loss_tmo parameter of an SCSI layer and the qlport_down_retry parameter of the Qlogic HBA driver are configured, and values of the parameters are set to the minimum values, so that the HBA driver can quickly sense link disconnection and return the error code to the multipathing software. The multipathing software performs link switching based on the returned error code, and the service is delivered by using another normal link, to shorten the service switching time.

It should be noted that, to prevent service continuity from being affected due to temporary link disconnection and recovery, and avoid misjudgment of intermittent disconnection as a link fault, generally, the time for the HBA driver to sense link disconnection is not set to an excessively small value. Generally, the default parameter value is greater than 5 seconds. Therefore, the current solution cannot effectively shorten the service switching time, and cannot improve system reliability.

Based on the above, this application provides a faulty link switching method. A storage device may sense whether a link is faulty and actively notify a host of the faulty link, and the host delivers an instruction for disconnecting the faulty link. In this way, link switching can be quickly completed, a service switching time can be shortened, and system reliability can be improved.

The technical solutions in embodiments of this application may be applied to any system in which link switching needs to be performed, and in particular, are applicable to a scenario in which a plurality of paths exist between the host and the storage device, for example, an SCSI networking scenario or an NVMe-oF scenario. For example, in a multipath scenario of a SAN storage network in SCSI networking, when a link between the host and the storage device is faulty, the storage device may perform link switching by using the faulty link switching method provided in embodiments of this application, to shorten a service switching time and improve system reliability.

Figure 2:
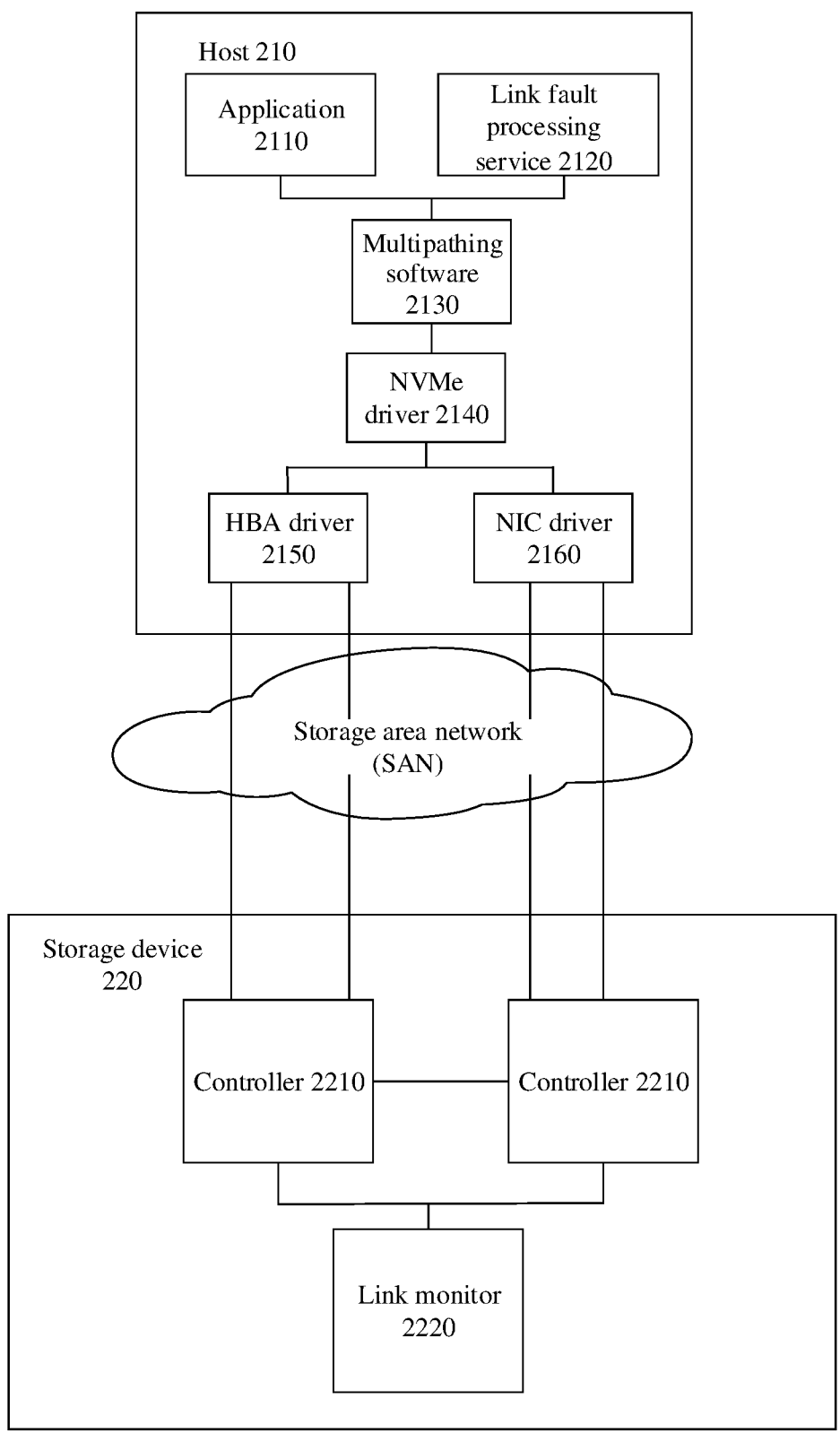
FIG. 2 is a schematic diagram of a system architecture according to an embodiment of this application.

FIG. 2 is a schematic diagram of a system architecture according to an embodiment of this application. As shown in FIG. 2, the system 200 includes a host 210 and a storage device 220. The host 210 is connected to the storage device 220 by using an FC network or an Ethernet (ETH). A plurality of links (for example, a plurality of fiber channels) exist between the host 210 and the storage device 220. The host 210 includes an application 2110, a link fault processing service 2120, multipathing software 2130, an NVMe driver 2140, an HBA driver 2150, and a network interface controller (NIC) driver 2160. The storage device 220 includes a controller 2210 and a link monitor 2220. The link fault processing service 2120 in the host 210 continuously or periodically delivers a link fault query request on each link. The application 2110 generates a service that needs to be delivered, and delivers the service to the controller 2210 in the storage device 220 by using the multipathing software 2130. The link monitor 2220 monitors each link between the host 210 and the storage device 220. When detecting that a link is faulty (for example, detecting an optical signal or electrical signal interruption of a particular session link between the host 210 and the storage device 220), the link monitor 2220 adds, to feedback information of the link fault query request delivered by the link fault processing service 2120, unique identification information corresponding to the faulty link (for example, world wide names (WWN) or internet protocol (IP) addresses of an initiator and a target), and returns the feedback information to the link fault processing service 2120 by using another normal link. After receiving the unique identification information corresponding to the faulty link, the link fault processing service 2120 identifies a link identifier (for example, NVMe ctrl) corresponding to the faulty link, and then disconnects the faulty link (for example, the link identifier corresponding to the faulty link is deleted from the host, or a state of the faulty link is set to an unavailable state; and the link identifier is generated when the host establishes a connection to the storage device, and is used to identify a link between the host and the storage device, and one link identifier is generated for each link). The HBA driver 2150 or the NIC driver 2160 immediately returns error code to the multipathing software 2130, and the multipathing software 2130 identifies the error code and performs link switching, and switches the service generated by the application 2110 to another normal link for delivery.

It can be learned that, compared with the faulty link switching shown in FIG. 1, in the faulty link switching system shown in FIG. 2, the storage device senses a link fault and actively notifies the host, and the HBA driver or a NIC driver of the host is prevented from sensing a link fault. In this way, a time for the HBA driver or the NIC driver to sense link disconnection can be reduced, so that link switching can be quickly completed, a service switching time can be shortened, and system reliability can be improved.

Figure 3:
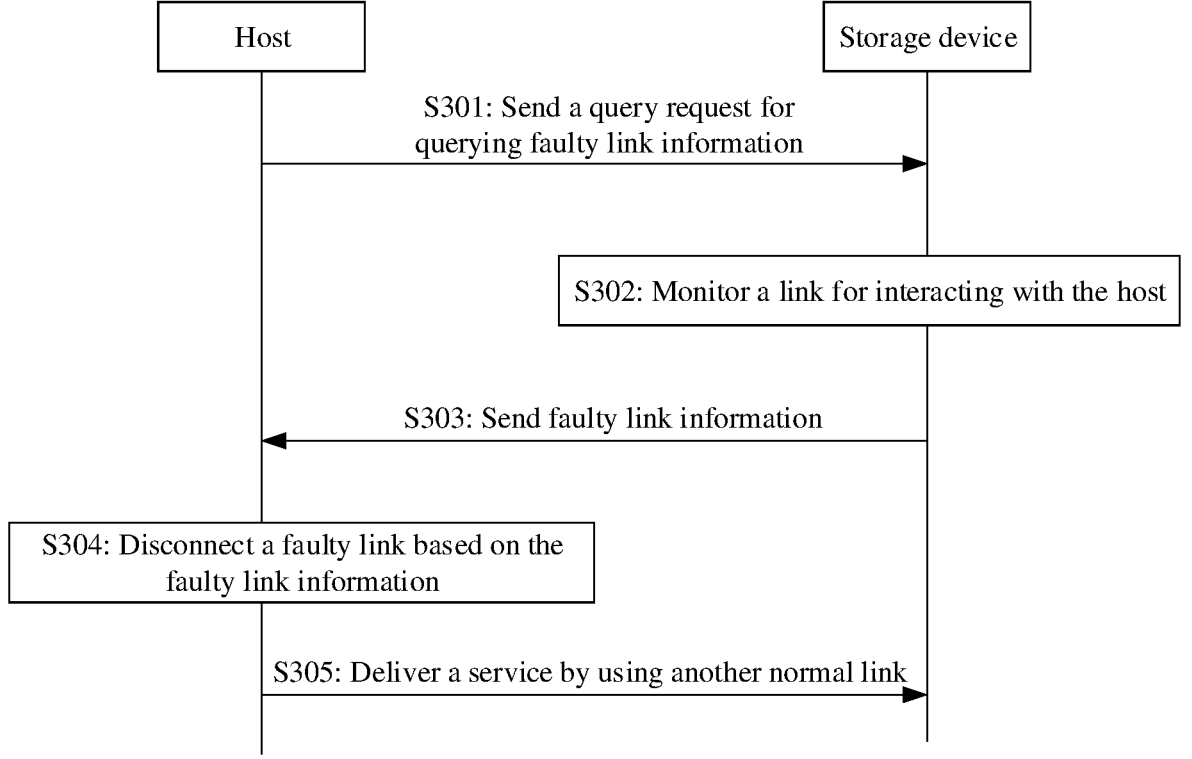
FIG. 3 is a schematic flowchart of a link fault switching method according to an embodiment of this application.

With reference to the schematic diagram of the system architecture shown in FIG. 2, the following describes a faulty link switching method according to an embodiment of this application. As shown in FIG. 3, the procedure includes the following steps.

S301: A host 210 sends a query request for querying faulty link information to a storage device 220.

Specifically, the host 210 and the storage device 220 are connected by using a SAN, and a plurality of links (for example, a plurality of fiber channels) exist between the host 210 and the storage device 220. A link fault processing service 2120 deployed in the host 210 delivers, on each link, the query request for querying the faulty link information.

Optionally, the host 210 may periodically deliver the query request on each link to query the faulty link information, and the period may be set based on a requirement, for example, set to 500 milliseconds. Alternatively, the host 210 continuously and serially delivers the query request on each link to query the faulty link information. When no fault occurs, the storage device 220 returns an acknowledgment message at fixed intervals (for example, 5 seconds). Once a fault occurs, the storage device 220 immediately adds the faulty link information to feedback information of the query request, and returns the feedback information.

It can be learned that, by periodically delivering the query request to query the faulty link information, link resources do not need to be always occupied. However, delivery operations are relatively frequent, and the storage device 220 cannot perform feedback immediately. However, when the query request is continuously delivered serially to query the faulty link information, at least one I/O of each link always occupies link resources, but delivery operations do not need to be performed frequently. In addition, the storage device 220 can feed back the faulty link information immediately, so that feedback efficiency is improved. A specific manner to be selected is not limited in this application.

S302: The storage device 220 monitors a link for interacting with the host 210.

Specifically, a link monitor 2220 in the storage device 220 monitors each link. If a link is suddenly faulty, the link monitor 2220 immediately senses the fault. For example, if an optical signal or an electrical signal of a particular link between the host 210 and the storage device 220 is suddenly interrupted, the link monitor 2220 can immediately sense and determine that the link is faulty.

S303: The storage device 220 sends faulty link information to the host 210.

Specifically, after sensing that a link is faulty, the link monitor 2220 in the storage device 220 fills unique identification information of the faulty link into the feedback information of the faulty link query request delivered by the host 210. Because there is another normal link between the host 210 and the storage device 220, the unique identification information of the faulty link may be successfully returned to the host 210, and then returned to the link fault processing service 2120 in the host 210.

It should be understood that, the storage device 220 cannot directly and actively send a message to the host 210. Therefore, even if the storage device 220 senses that a link is faulty, the storage device 220 cannot actively notify the host 210 of related faulty link information. The host 210 needs to deliver the query request for querying the faulty link information to the storage device 220, so that the storage device 220 performs feedback based on the received query request, so as to obtain the faulty link information. After receiving the query request, the storage device queries a state of each link. After determining that a link is faulty, the storage device adds link information to the feedback information of the query request, and sends the feedback information to the host 210. For example, a manner in which the storage device queries the state of each link may be as follows: A memory of the storage device stores the state of each link (for example, a segment of storage space is filled with o or a negotiated value to indicate the state of the link). After receiving the query request delivered by the host 210, the storage device 220 queries the state of each link and reads state information of each link. When determining that a link is faulty, the storage device 220 adds the faulty link information to the feedback information of the query request, and sends the feedback information to the host 210.

It should be noted that, the unique identification information of the faulty link represents different meanings in different application scenarios. For example, in an FC-SCSI or FC-NVMe networking scenario, the unique identification information may be WWNs of an initiator and a target, where the initiator is a port of the link on the host 210 (namely, a port of an HBA card), and the target is a port of the link on the storage device 220. In an RoCE-NVMe networking scenario, the unique identification information may be IP address of the initiator and the target. Herein, a port of the initiator is a port of an ETH network adapter (namely, a port of a NIC). It should be understood that, the IP address are allocated and used when a connection is established between the host 210 and the storage device 220, and appear in pairs. An IP of each initiator in the host 210 uniquely corresponds to an IP of a target in the storage device 220, and one IP address pair may uniquely identify one link.

S304: The host 210 disconnects the faulty link based on the faulty link information.

Specifically, after receiving the WWN or IP address pair, fed back by the storage device 220, of the initiator and the target of the faulty link, the link fault processing service 2120 in the host 210 identifies a link identifier corresponding to the faulty link. The link identifier is an object created by the host 210 for managing links. Each link has a unique link identifier. For example, the link identifier may be NVMe ctrl.

It should be noted that, an NVMe driver 2140 in the host 210 pre-stores information about all links between the host 210 and the storage device 220. Each link is identified by using the WWN or IP address pair of the initiator and the target, and there is a unique link identifier corresponding to the link.

For example, after receiving the WWN or IP address pair of the initiator and the target, the link fault processing service 2120 views, with reference to an NVMe list_subsys command, the information about all links that is stored in the NVMe driver 2140, so as to identify the link identifier corresponding to the faulty link. Then, after identifying, by using the multipathing software 2130, that another normal link exists between the host 210 and the storage device 220, the link fault processing service 2120 deletes the link identifier (for example, NVMe ctrl) by using an NVMe disconnect command, to trigger the HBA driver 2150 or the NIC driver 2160, after detecting that the link identifier is deleted, to add error code to an I/O request that is already sent by using the link corresponding to the link identifier but for which no acknowledgment information is received, and send the I/O request to the multipathing software 2130. The multipathing software 2130 identifies the error code, determines that the link is faulty, and resends the I/O request to the storage device by using a normal link. Alternatively, the link fault processing service 2120 delivers a keep alive command to trigger the HBA driver 2150 or the NIC driver 2160 to perform an operation of routinely detecting a link fault, that is, the HBA driver 2150 or the NIC driver 2160 immediately delivers a detection I/O to the storage device 220 to detect a link state. If it is detected that the link state is a fault state, the link identifier is deleted, and the error code is carried in the IO request for which no acknowledgment information is received on the link, and the IO request carrying the error code is sent to the multipathing software 2130. The multipathing software 2130 identifies the error code, determines that the link is faulty, and redelivers the IO request to the storage device by using the normal link, to perform link switching.

It can be learned that, after receiving the faulty link information returned by the storage device, the host actively delivers the command to delete the link identifier corresponding to the faulty link or trigger the HBA driver or the NIC driver to perform the routine detection operation, so that the HBA driver or NIC driver immediately returns the error code to the multipathing software, instead of returning, by the HBA driver or the NIC driver, the error code to the multipathing software after actively sensing and confirming that the link is faulty. In this way, it can be ensured that the multipathing software can receive the error code in a timely manner, to complete link switching, thereby greatly shortening a service switching time and improving system reliability.

S305: The host 210 delivers a service by using another normal link.

Specifically, after identifying the error code, the multipathing software 2130 sets a state of the current path to a fault (fault) state, reselects a link (for example, a link may be randomly selected) from remaining links for retry, and sends a service I/O to the storage device 220. After a success message returned by the storage device 220 can be received, it may be determined that the reselected link is a normal link and can support service delivery. The multipathing software 2130 notifies the application 2110 that the service IO may be delivered by using the reselected link, to complete a read/write operation on data in the storage device 220.

The method in embodiments of this application is described in detail above. For ease of better implementing the foregoing solutions in embodiments of this application, correspondingly, related devices used to cooperate in implementing the foregoing solutions are further provided below.

Figure 4:
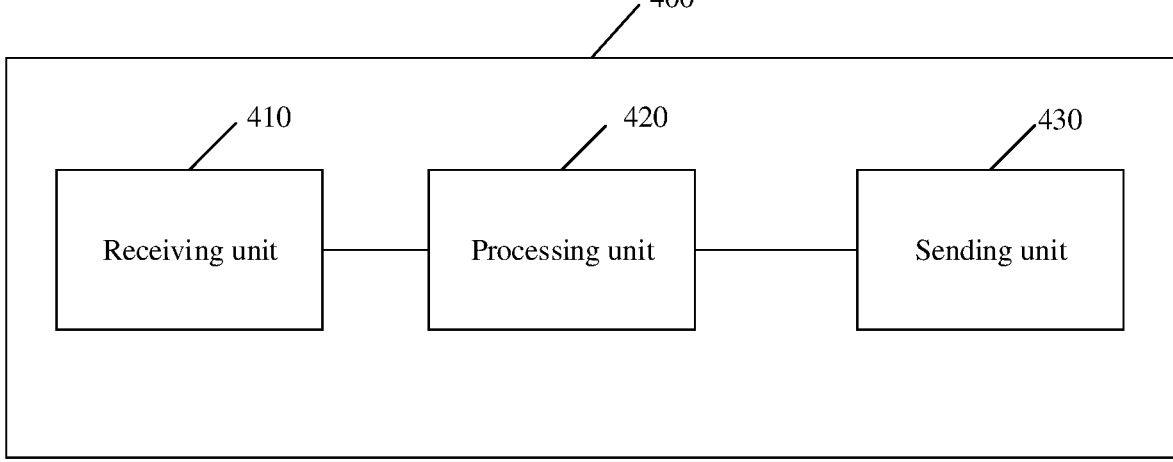
FIG. 4 is a schematic diagram of a structure of a network device according to an embodiment of this application.

FIG. 4 is a schematic diagram of a structure of a network device according to an embodiment of this application. The network device may be the host in the method embodiment shown in FIG. 3, and may perform the method and the steps in which the host is used as an execution body in the embodiment of the faulty link switching method shown in FIG. 3. As shown in FIG. 4, the network device 400 includes a receiving unit 410, a processing unit 420, and a sending unit 430.

The receiving unit 410 is configured to receive faulty link information sent by a storage device, where at least two links exist between the network device and the storage device.

The processing unit 420 is configured to switch, based on the faulty link information, a service on a faulty link corresponding to the faulty link information to a normal link in the at least two links.

Specifically, the receiving unit 410 is configured to perform step S303, and optionally perform the optional method in the foregoing step. The processing unit 420 is configured to perform step S304, and optionally perform the optional method in the foregoing step. The sending unit 430 is configured to perform steps S301 and S305, and optionally perform the optional method in the foregoing step. Data may be transmitted between the foregoing three units by using a communication channel. It should be understood that, the units included in the network device 400 may be software units, hardware units, or some software units and some hardware units.

In an embodiment, the sending unit 430 is configured to send a query request for querying the faulty link information to the storage device. The receiving unit 410 is specifically configured to receive feedback information that is of the query request and that is sent by the storage device, where the feedback information carries the faulty link information.

In an embodiment, the processing unit 420 is further configured to disconnect the faulty link based on the faulty link information.

In an embodiment, the processing unit 420 is specifically configured to: send error code to multipathing software, and switch, by the multipathing software, the service on the faulty link to the normal link.

In an embodiment, the sending unit 430 is specifically configured to: send, to the storage device based on a preset period, the query request for querying the faulty link information; or continuously and serially send the query request for querying the faulty link information to the storage device.

In an embodiment, the faulty link information is unique identification information of the faulty link, the unique identification information of the faulty link includes world wide names WWNs or Internet Protocol IP addresses of an initiator and a target, the initiator is a port of the faulty link on the network device, and the target is a port of the faulty link on the storage device.

It should be understood that, the structure of the network device is merely used as an example, and should not constitute a specific limitation. The units of the network device may be added, reduced, or combined based on a requirement. In addition, operations and/or functions of the units in the network device are separately used to implement corresponding procedures of the method described in FIG. 3. For brevity, details are not described herein again.

Figure 5:
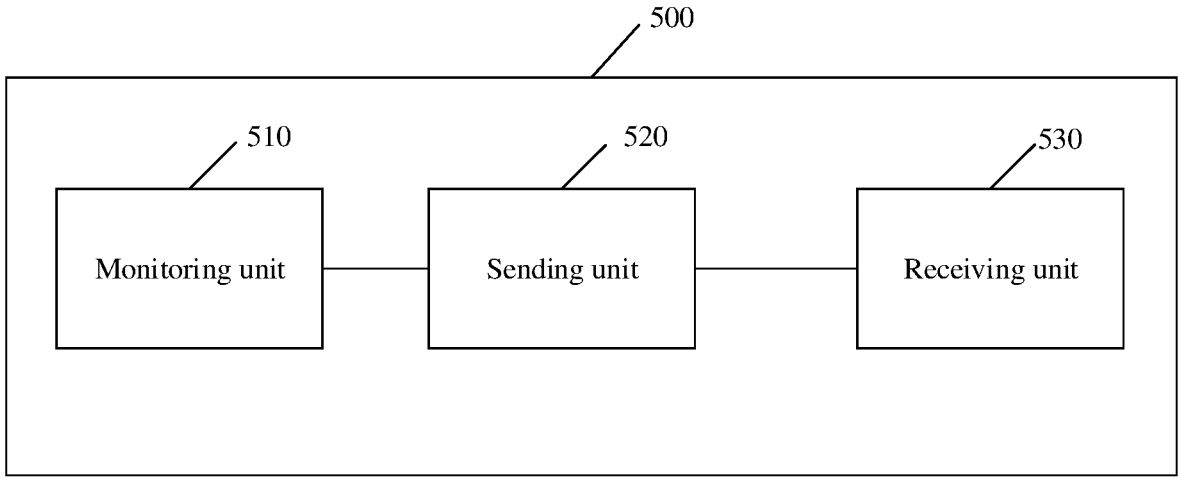
FIG. 5 is a schematic diagram of a structure of a storage device according to an embodiment of this application.

FIG. 5 is a schematic diagram of a structure of a storage device according to an embodiment of this application. The storage device may be the storage device in the method embodiment shown in FIG. 3, may perform the method and the steps in which the storage device is used as an execution body in the embodiment of the faulty link switching method shown in FIG. 3. As shown in FIG. 5, the storage device 500 includes a monitoring unit 510, a sending unit 520, and a receiving unit 530.

The monitoring unit 510 is configured to monitor a link for interacting with a host, where at least two links exist between the storage device and the host.

The sending unit 520 is configured to send faulty link information to the host when the monitoring unit 510 detects a link fault, so that the host switches a service on a faulty link to a normal link in the at least two links based on the faulty link information.

The receiving unit 530 is configured to receive a service delivered by the host by using the normal link.

Specifically, the monitoring unit 510 is configured to perform step S302, and optionally perform the optional method in the foregoing step. The sending unit 520 is configured to perform step S303, and optionally perform the optional method in the foregoing step. The receiving unit 530 is configured to perform steps S301 and S305, and optionally perform the optional method in the foregoing step. Data may be transmitted between the foregoing three units by using a communication channel. It should be understood that, the units included in the storage device 500 may be software units, hardware units, or some software units and some hardware units.

In an embodiment, the receiving unit 530 is further configured to receive a query request that is sent by the host and that is used to query the faulty link information; and the sending unit 520 is further configured to: add the faulty link information to feedback information of the query request, and send the feedback information to the host.

In an embodiment, the sending unit 520 is specifically configured to send the faulty link information to the host by using the normal link in the at least two links.

In an embodiment, the receiving unit 530 is specifically configured to: receive the query request that is sent by the host based on a preset period and that is used to query the faulty link information; or receive the query request that is sent by the host serially and that is used to query the faulty link information.

In an embodiment, the faulty link information is unique identification information of the faulty link, the unique identification information of the faulty link includes world wide names WWNs or Internet Protocol IP addresses of an initiator and a target, the initiator is a port of the faulty link on the host, and the target is a port of the faulty link on the storage device.

It should be understood that, the structure of the storage device is merely used as an example, and should not constitute a specific limitation. The units of the storage device may be added, reduced, or combined based on a requirement. In addition, operations and/or functions of the units in the storage device are separately used to implement corresponding procedures of the method described in FIG. 3. For brevity, details are not described herein again.

Figure 6:
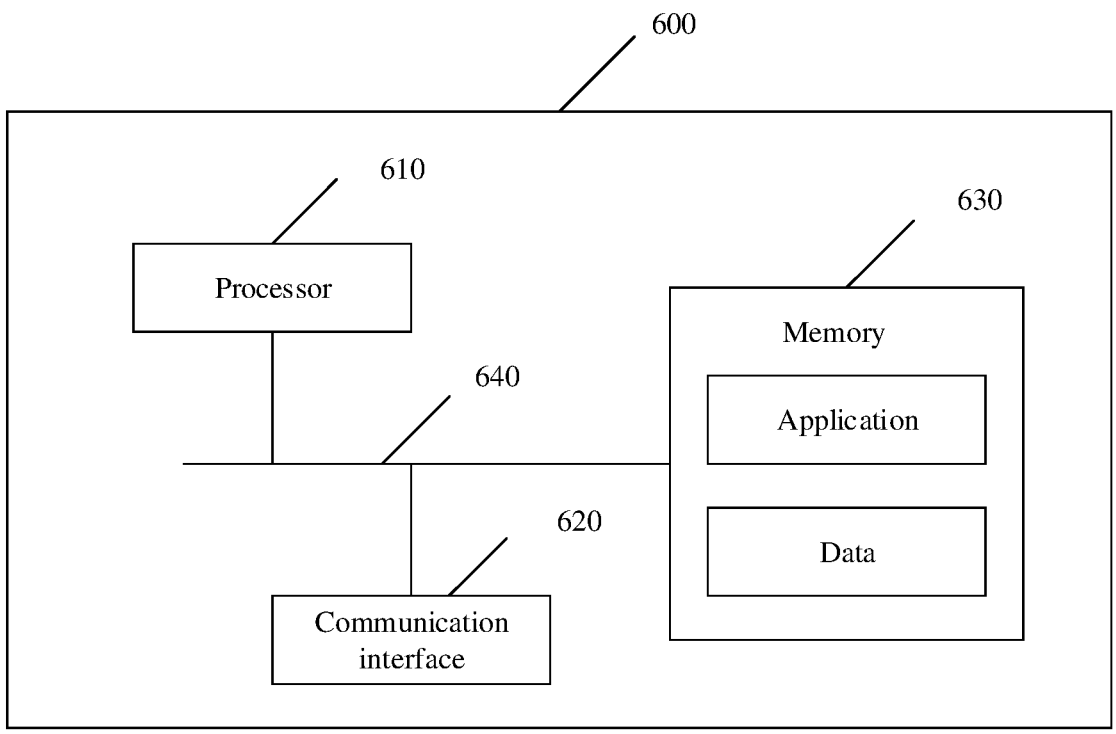
FIG. 6 is a schematic diagram of a structure of a computing device according to an embodiment of this application.

FIG. 6 is a schematic diagram of a structure of a computing device according to an embodiment of this application. As shown in FIG. 6, the computing device 600 includes a processor 610, a communication interface 620, and a memory 630. The processor 610, the communication interface 620, and the memory 630 are connected to each other by using an internal bus 640.

The computing device 600 may be the host in FIG. 2. The function performed by the host in FIG. 2 is actually performed by the processor 610 of the host.

The processor 610 may include one or more general-purpose processors, for example, a central processing unit (CPU), or a combination of a CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The bus 640 may be a peripheral component interconnect (PCI) bus, an extended industry standard architecture (EISA) bus, or the like. The bus 640 may be classified into an address bus, a data bus, a control bus, and the like. For ease of representation, only one thick line is used to represent the bus in FIG. 6, but this does not indicate that there is only one bus or only one type of bus.

The memory 630 may include a volatile memory, for example, a random access memory (RAM); or the memory 630 may include a non-volatile memory, for example, a read-only memory (ROM), a flash memory, a hard disk drive (HDD), or a solid-state drive (SSD); or the memory 630 may include a combination of the foregoing types. Program code may be used to implement the functional units shown in the network device 400, or may be used to implement the method steps in which the host is used as an execution body in the method embodiment shown in FIG. 3.

Figure 7:
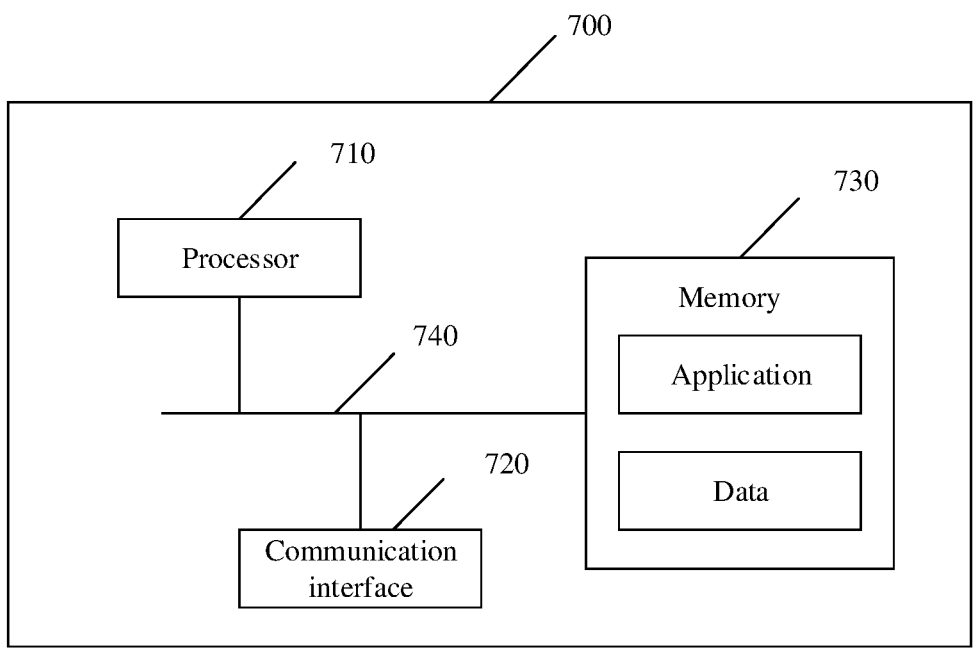
FIG. 7 is a schematic diagram of a structure of another computing device according to an embodiment of this application.

FIG. 7 is a schematic diagram of a structure of another computing device according to an embodiment of this application. As shown in FIG. 7, the computing device 700 includes a processor 710, a communication interface 720, and a memory 730. The processor 710, the communication interface 720, and the memory 730 are connected to each other by using an internal bus 740.

The computing device 700 may be the storage device in FIG. 2. The function performed by the storage device in FIG. 2 is actually performed by the processor 710 of the storage device.

The processor 710 may include one or more general-purpose processors, such as a CPU or a combination of a CPU and a hardware chip. The hardware chip may be an ASIC, a PLD, or a combination thereof. The PLD may be a CPLD, an FPGA, a GAL, or any combination thereof.

The bus 740 may be a PCI bus, an EISA bus, or the like. The bus 740 may be classified into an address bus, a data bus, a control bus, and the like. For ease of representation, only one thick line is used to represent the bus in FIG. 7, but this does not indicate that there is only one bus or only one type of bus.

The memory 730 may include a volatile memory, for example, a RAM; or the memory 730 may include a non-volatile memory, for example, a ROM, a flash memory, an HDD, or an SSD; or the memory 730 may include a combination of the foregoing types. Program code may be used to implement the functional units shown in the storage device 500, or may be used to implement the method steps in which the storage device is used as an execution body in the method embodiment shown in FIG. 3.

An embodiment of this application further provides a computer-readable storage medium storing a computer program. When the program is executed by a processor, some or all of the steps of any method recorded in the foregoing method embodiment can be implemented, and a function of any functional unit described in FIG. 6 can be implemented.

An embodiment of this application further provides a computer program product. When the computer program product is run on a computer or a processor, the computer or the processor is enabled to perform one or more steps in any one of the foregoing methods. If each composition unit of the foregoing devices is implemented in a form of a software functional unit and sold or used as an independent product, the unit may be stored in the computer-readable storage medium.

In the foregoing embodiments, the descriptions in the embodiments have respective focuses. For a part that is not described in detail in an embodiment, refer to related descriptions in other embodiments.

It should be further understood that sequence numbers of the foregoing processes do not mean execution sequences in various embodiments of this application. The execution sequences of the processes should be determined based on functions and internal logics of the processes, and should not constitute any limitation on the implementation processes of embodiments of this application.

A person skilled in the art can clearly understand that, for the purpose of convenient and brief description, for a detailed working process of the foregoing system, apparatuses, and units, refer to the corresponding process in the foregoing method embodiment. Details are not described herein again.

When the function is implemented in the form of a software functional unit and sold or used as an independent product, the function may be stored in a computer-readable storage medium. Based on such an understanding, the technical solutions of this application essentially, or the part contributing to the conventional technology, or some of the technical solutions may be reflected in the form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, for example, a USB flash drive, a removable hard disk, a read-only memory (ROM), a random access memory (RAM), a magnetic disk, or an optical disc.

Based on the above, the foregoing embodiments are merely used to describe the technical solutions of this application, but not to limit this application. Although this application is described in detail with reference to the foregoing embodiments, a person of ordinary skill in the art should understand that, the person may still modify the technical solutions recorded in the foregoing embodiments or perform equivalent replacement on some of the technical features therein, and these modifications or replacements do not make essence of the corresponding technical solutions depart from the scope of the technical solutions of embodiments of this application.

What is claimed is:

1. A switching system comprising:
a host;
a storage device; and
at least two links existing between the host and the storage device,
wherein the host is configured to:
periodically send query requests for querying faulty link information to the storage device,
wherein the storage device is configured to:
monitor the at least two links,
receive the query requests from the host,

in response to detection of a link fault and reception of a first query request of the query requests, add the faulty link information to feedback information of the first query request, and
send the feedback information to the host,
wherein the host is further configured to:
receive the faulty link information sent by the storage device, and
switch, based on the faulty link information, a service on a faulty link corresponding to the faulty link information to a normal link of the at least two links, and
wherein the storage device is further configured to send the faulty link information to the host by using the normal link of the at least two links.

2. The switching system according to claim 1, wherein the host is further configured to disconnect the faulty link based on the faulty link information.

3. The switching system according to claim 2, wherein the host is configured to switch the service on the faulty link corresponding to the faulty link information to the normal link by: sending, by a host bus adapter (HBA) card driver of the host, error code to multipathing software of the host, and switching, by the multipathing software of the host, the service on the faulty link to the normal link.

4. The switching system according to claim 3, wherein the query requests are sent by a link fault processing service of the host, the feedback information is received by the link fault processing service, and the link fault processing service is separate from the HBA card driver.

5. The switching system according to claim 1, wherein the faulty link information is unique identification information of the faulty link, the unique identification information including world-wide names (WWNs) or Internet Protocol (IP) addresses of an initiator and a target.

6. The switching system according to claim 1, wherein the query requests are sent on each link.

7. The switching system according to claim 1, wherein the query requests are sent serially on the links.

8. The switching system according to claim 1, wherein the storage device is configured to send an acknowledgment message when no link fault is detected.

9. The switching system according to claim 8, wherein the acknowledgment message is sent at fixed intervals.

10. A switching method comprising:
periodically sending, by a host, query requests for querying faulty link information to a storage device;
receiving, by the host, the faulty link information in feedback information of a first query request of the query requests, wherein the feedback information was sent by the storage device, wherein at least two links exist between the host and the storage device, and wherein the faulty link information was added to the feedback information by the storage device in response to detection of a link fault and reception of the first query request; and
switching, by the host based on the faulty link information, a service on a faulty link corresponding to the faulty link information to a normal link of the at least two links, wherein the faulty link information is received, by the host, via the normal link of the at least two links.

11. The switching method according to claim 10, further comprising disconnecting, by the host, the faulty link based on the faulty link information.

12. The switching method according to claim 11, wherein switching the service on the faulty link corresponding to the faulty link information to the normal link comprises:

sending, by an HBA card driver of the host, error code to a multipathing software of the host, and switching, by the multipathing software of the host, the service on the faulty link to the normal link.

13. The switching method according to claim 12, wherein the query requests are sent by a link fault processing service of the host, the feedback information is received by the link fault processing service, and the link fault processing service is separate from the HBA card driver.

14. A switching method comprising:

periodically receiving, by a storage device, query requests for querying faulty link information from a host, wherein at least two links exist between the storage device and the host;

in response to detection of a link fault and reception of a first query request of the query requests, adding, by the storage device, the faulty link information to feedback information of the first query request; and sending, by the storage device, the feedback information to the host so that the host is able to switch a service on a faulty link to a normal link of the at least two links based on the faulty link information, wherein the faulty link information is sent to the host by using the normal link of the at least two links; and receiving, by the storage device, the service delivered by the host via the normal link.

15. The switching method according to claim 14, wherein the faulty link information is unique identification information of the faulty link, the unique identification information including world-wide names (WWNs) or Internet Protocol (IP) addresses of an initiator and a target.

16. The switching method according to claim 14, wherein the query requests are received from a link fault processing service of the host, the feedback information is sent to the link fault processing service, and the link fault processing service is separate from a host bus adapter (HBA) card driver of the host.

17. A computing device comprising:

a memory; and at least one processor configured to execute a computer program stored in the memory, the computer program including instructions for:

periodically receive query requests for querying faulty link information from a host;

monitoring a link for interacting with the host, wherein at least two links exist between a storage device and the host;

in response to detection of a link fault and reception of a first query request of the query requests, adding the faulty link information to feedback information of the first query request;

sending the feedback information to the host to indicate the host switching a service on a faulty link to a normal link of the at least two links based on the faulty link information, wherein the faulty link information is sent to the host by using the normal link of the at least two links; and receiving the service delivered by the host by using the normal link.

18. The computing device according to claim 17, wherein the faulty link information is unique identification information of the faulty link, the unique identification information including world-wide names (WWNs) or Internet Protocol (IP) addresses of an initiator and a target.

19. The computing device according to claim 17, wherein the query requests are received from a link fault processing service of the host, the feedback information is sent to the link fault processing service, and the link fault processing service is separate from a host bus adapter (HBA) card driver of the host.

* * * * *